(12) United States Patent
Takahashi et al.

(10) Patent No.: US 12,358,193 B2
(45) Date of Patent: Jul. 15, 2025

(54) METHOD FOR PRODUCING GLASS PLATE WITH RESIN FRAME FOR VEHICLE WINDOW AND DEVICE FOR PRODUCING GLASS PLATE WITH RESIN FRAME FOR VEHICLE WINDOW

(71) Applicant: AGC Inc., Tokyo (JP)

(72) Inventors: Kazuhiro Takahashi, Tokyo (JP); Kazuya Kawaguchi, Tokyo (JP); Jun Ito, Tokyo (JP)

(73) Assignee: AGC INC., Tokyo (JP)

( * ) Notice: Subject to any disclaimer, the term of this patent is extended or adjusted under 35 U.S.C. 154(b) by 143 days.

(21) Appl. No.: 18/117,165

(22) Filed: Mar. 3, 2023

(65) Prior Publication Data
US 2023/0202084 A1    Jun. 29, 2023

Related U.S. Application Data

(63) Continuation of application No. PCT/JP2021/032350, filed on Sep. 2, 2021.

(30) Foreign Application Priority Data

Sep. 4, 2020    (JP) ................. 2020-149150

(51) Int. Cl.
*B29C 45/14* (2006.01)
*B29C 45/00* (2006.01)
*B29L 31/30* (2006.01)

(52) U.S. Cl.
CPC .... *B29C 45/14434* (2013.01); *B29C 45/0055* (2013.01); *B29C 2045/0058* (2013.01); *B29C 2793/009* (2013.01); *B29L 2031/3052* (2013.01)

(58) Field of Classification Search
None
See application file for complete search history.

(56) References Cited

FOREIGN PATENT DOCUMENTS

| | | |
|---|---|---|
| JP | S64-18590 A | 1/1989 |
| JP | S64-018590 A | 1/1989 |
| JP | H07-223847 A | 8/1995 |
| JP | 3423054 B2 | 7/2003 |
| JP | 2014-091362 A | 5/2014 |
| JP | 2014-205392 A | 10/2014 |
| JP | 2019-209614 A | 12/2019 |
| WO | WO-2017/183701 A1 | 10/2017 |

OTHER PUBLICATIONS

Machine English translation of JP2014091362, Accessed Sep. 17, 2024 (Year: 2014).*
Machine English translation of JPS6418590, Accessed Sep. 17, 2024 (Year: 1989).*

(Continued)

*Primary Examiner* — Jacob T Minskey
*Assistant Examiner* — Adrianna N Konves
(74) *Attorney, Agent, or Firm* — Foley & Lardner LLP (57) ABSTRACT

To produce a glass plate with resin frame in a short time at a low cost, and to reduce scars on the glass and the resin frame. A method for producing a glass plate with resin frame, which comprises forming a resin frame on a peripheral portion of a glass plate by injection molding, and removing a flash formed at an inner peripheral edge of the resin frame by irradiation with laser beam.

9 Claims, 9 Drawing Sheets (56) References Cited

OTHER PUBLICATIONS

Machine English translation of WO2017183701, Accessed Sep. 17, 2024 (Year: 2019).*
International Searching Authority, "International Search Report," issued in connection with International Patent Application No. PCT/JP2021/032350, dated Oct. 5, 2021.
International Searching Authority, "Written Opinion," issued in connection with International Patent Application No. PCT/JP2021/032350, dated Oct. 5, 2021.

* cited by examiner

METHOD FOR PRODUCING GLASS PLATE WITH RESIN FRAME FOR VEHICLE WINDOW AND DEVICE FOR PRODUCING GLASS PLATE WITH RESIN FRAME FOR VEHICLE WINDOW

CROSS-REFERENCE TO RELATED APPLICATIONS

This application is a Bypass Continuation of PCT Application No. PCT/JP2021/032350, filed on Sep. 2, 2021, which is based upon and claims the benefit of priority from Japanese Patent Application No. 2020-149150 filed on Sep. 4, 2020. The contents of those applications are incorporated herein by reference in their entireties.

TECHNICAL FIELD

The present invention relates to a method for producing a glass plate with resin frame for a vehicle window, and an apparatus for producing a glass plate with resin frame for a vehicle window.

BACKGROUND ART

As a member for a vehicle window, a structure having a glass plate and a frame provided on its peripheral portion integrated, has been known. Many of such glass plates with frame are produced by disposing a glass plate in the cavity of a mold and injection-molding a resin on the peripheral portion of the glass plate (for example, the following Patent Document 1).

PRIOR ART DOCUMENTS

Patent Documents

Patent Document 1: JP-A-H07-223847

DISCLOSURE OF INVENTION

Technical Problem

By injection molding as disclosed in Patent Document 1, particularly at an inner peripheral edge of the resin frame (at the parting position between the resin frame and the glass plate), a flash is likely to form. The flash is a portion unnecessary for a product and may impair the appearance of the product, and thus it is preferred to conduct a finishing step of removing the flash after injection-molding the resin frame. However, heretofore, such a flash is removed manually with cutting tools, and thus the removal of the flash is complicated and takes time and costs. Further, the glass or the resin frame may be scarred e.g. by the cutting tools during the operation for removing the flash.

Under these circumstances, the object of the present invention according to an embodiment is to provide a method which can produce a glass plate with resin frame in a short time at a low cost, and can reduce scars on the glass and the resin frame.

Solution to Problem

According to an embodiment of the present invention, provided is a method for producing a glass plate with resin frame for a vehicle window, which comprises forming a resin frame on a peripheral portion of a glass plate by injection molding, and
removing a flash formed at an inner peripheral edge of the resin frame by irradiation with laser beam.

According to another embodiment of the present invention, provided is an apparatus for producing a glass plate with resin frame for a vehicle window, which comprises a resin forming unit to form a resin frame on a peripheral portion of a glass plate by injection molding, and
a finishing unit to remove a flash formed at an inner peripheral edge of the resin frame by irradiation with laser beam.

Advantageous Effects of Invention

According to such embodiments, it is possible to produce a glass plate with resin frame for a vehicle window in a short time at a low cost, and is possible to reduce scars on the glass and the resin frame.

DESCRIPTION OF EMBODIMENTS

Now, embodiments of the present invention will be described in detail with reference to drawings. In the following drawings, unless otherwise specified, the identical or corresponding members are represented by the same symbols, and repetition of description may sometimes be omitted. Further, the drawings are schematically described to help understand the invention, and the scales in the drawings may sometimes be different from actual ones.

Figure 1:
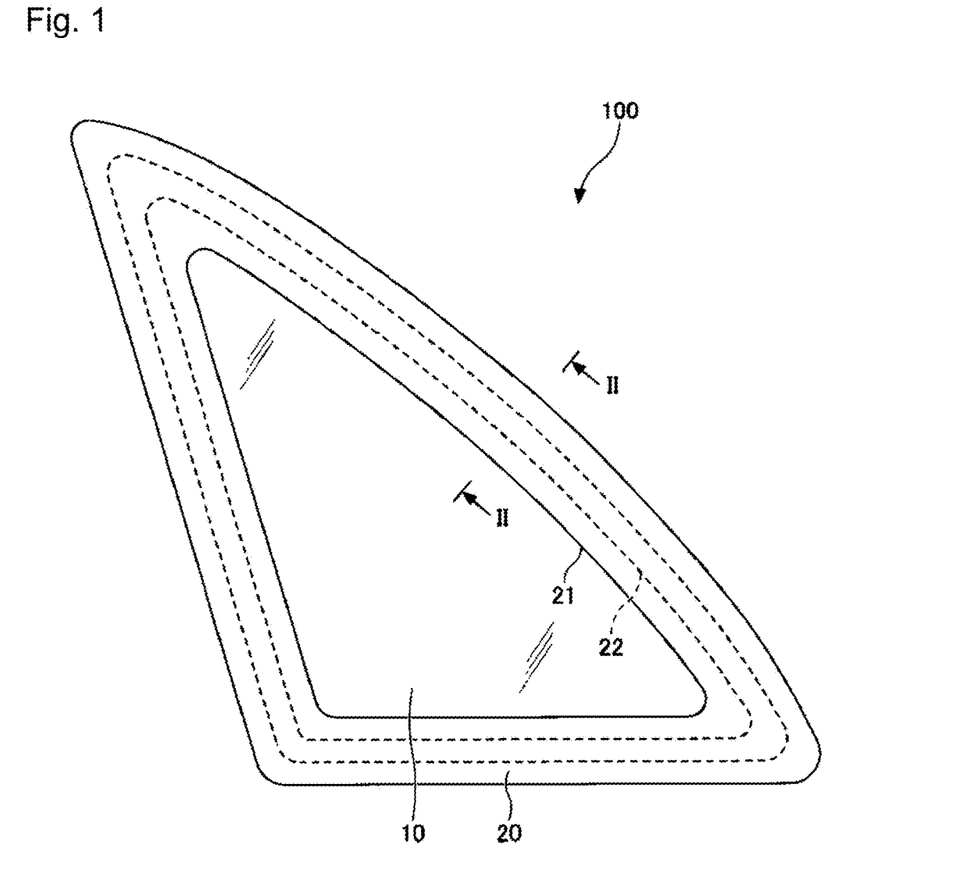
FIG. 1 is a plan view illustrating a glass plate with resin frame obtained according to an embodiment of the present invention.

In FIG. 1, a plan view illustrating a glass plate 100 with resin frame obtained according to an embodiment of the present invention, is shown. The glass plate 100 with resin frame so constituted for a vehicle or for a vehicle window will be explained as an example, and the plan view in FIG. 1 is a view illustrating the glass plate 100 with resin frame as viewed from the vehicle exterior side. Further in FIG. 2, a cross sectional view at the line II-II in FIG. 1 is shown.

Figure 2:
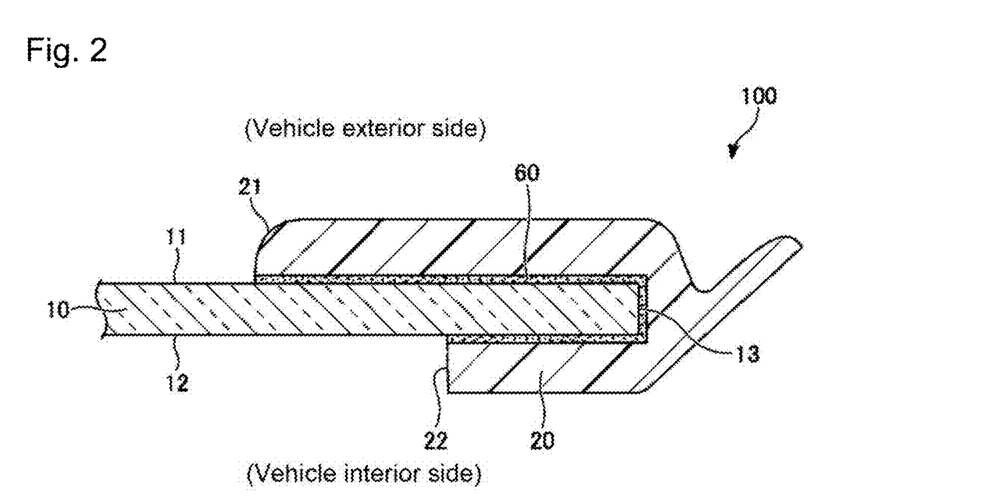
FIG. 2 is a cross sectional view at the line II-II in FIG. 1.

As shown in FIGS. 1 and 2, the glass plate 100 with resin frame may be constituted as Module Assy Window (MAW) (registered trademark) having a glass plate 10 and a resin frame 20 formed on the peripheral portion of the glass plate 10 integrated. By using Module Assy Window as a vehicle window material, the window glass together with the frame can be attached to the window frame of a vehicle, whereby the vehicle assembling operation can be simplified, and a structure with high air tightness and water tightness can be obtained. In this specification, "integrated" or "integrally" means a state where the respective members will not be disassembled during conventional operation to attach the window material to the vehicle body.

The glass plate with resin frame (MAW) obtained according to the present embodiment may be used, for example, for a windshield, a rear glass, a side glass, a roof glass, a front vent glass or a rear quarter glass. Among them, the glass plate with resin frame obtained according to the present embodiment is used preferably for an unopenable window material, particularly a front vent glass and a rear quarter glass.

The glass plate 10 used in the glass plate 100 with resin frame may be any glass plate for a vehicle window and is not particularly limited. Glass used for the glass plate 10 may be inorganic glass, and more specifically, may, for example, be soda lime silicate glass, aluminosilicate glass, borate glass, lithium aluminosilicate glass or borosilicate glass. The method for forming the glass plate 10 is also not particularly limited and is preferably glass formed by float process. Further, the glass plate 10 may be non-tempered glass or may be tempered glass having air cooling tempering treatment or chemical tempering treatment applied. Non-tempered glass is one obtained by forming molten glass into a plate, followed by annealing. Tempered glass is one having a compression stress layer formed on the surface of non-tempered glass, and may be physically tempered glass (for example air-tempered glass) or may be chemically tempered glass. In a case of air-tempered glass, the glass surface may be tempered by forming compression stress on the glass surface by a temperature difference between the glass surface and the glass interior, by quenching a uniformly heated glass plate, from a temperature in the vicinity of the softening point. In a case of chemically tempered glass, the glass surface may be tempered by forming compression stress on the glass surface e.g. by ion exchange method.

The glass plate 10 may be a glass plate which absorbs ultraviolet light or infrared light. The glass plate 10 is preferably transparent but may be glass colored to such an extent that its transparency is not impaired. Further, one or both of the principal surfaces of the glass plate 10 may be covered with a coating layer to impart ultraviolet shielding, infrared shielding, anti-fogging or other function.

The shape of the glass plate 10 as viewed two-dimensionally is also not limited and may, for example, be triangular, quadrangular, other polygonal, circular or elliptic. The apexes of the glass plate 10 may or may not be rounded.

The thickness of the glass plate 10 may be from 0.2 to 5 mm, preferably from 1.6 to 2.3 mm.

The glass plate 10 used in the present embodiment may be laminated glass having two or more glass plates formed by any of the above material laminated. The laminated glass may be one having two or more glass plates formed by any of the above material bonded via an interlayer containing a thermoplastic resin. For the interlayer for laminated glass, a thermoplastic resin may be used, and for example, a plasticized polyvinyl acetal resin, a plasticized polyvinyl chloride resin, a saturated polyester resin, a plasticized saturated polyester resin, a polyurethane resin, a plasticized polyurethane resin, an ethylene/vinyl acetate copolymer resin, an ethylene/ethyl acrylate copolymer resin, a cycloolefin polymer resin or an ionomer resin may be mentioned. Further, a resin composition containing a modified block copolymer hydride disclosed in Japanese Patent No. 6065221 may also be suitably used, and particularly, in view of excellent balance of various performances such as transparency, weather resistance, strength, adhesion, penetration resistance, impact energy absorption property, moisture resistance, heat shielding property and sound insulating property, a plasticized polyvinyl acetal resin is suitably used. Such a thermoplastic resin may be used alone or in combination of two or more. "Plasticized" in the plasticized polyvinyl acetal resin means being plasticized by addition of a plasticizer. The same applies to the other plasticized resins. The interlayer may be formed of a resin containing no plasticizer, such as an ethylene/vinyl acetate copolymer resin. The polyvinyl acetal resin may be a polyvinyl formal resin obtained by reacting polyvinyl alcohol (PVA) and formaldehyde, a narrowly defined polyvinyl acetal resin obtained by reacting PVA and acetaldehyde, a polyvinyl butyral resin (PVB) obtained by reacting PVA and n-butyraldehyde, or the like. Particularly in view of excellent balance of various performances such as transparency, weather resistance, strength, adhesion, penetration resistance, impact energy absorbing property, moisture resistance, heat shielding property and sound insulating property, PVB is mentioned as a preferred polyvinyl acetal resin. Such a polyvinyl acetal resin may be used alone or in combination of two or more.

In a case where the glass plate 10 is constituted as a laminated glass, the thickness of the glass plate to be disposed on the vehicle exterior side is preferably from 1.1 to 3 mm at the thinnest portion. When the thickness of the glass plate disposed on the vehicle exterior side is 1.1 mm or more, strength such as flying stone resistance will be sufficient, and when it is 3 mm or less, the mass of the laminated glass will not be too large, such being favorable in view of mileage of the vehicle. The thickness of the glass plate disposed on the vehicle exterior side, at the thinnest portion, is more preferably from 1.6 to 2.8 mm, further preferably from 1.6 to 2.6 mm, furthermore preferably from 1.6 to 2.3 mm, still more preferably from 1.6 to 2.0 mm. The thickness of the glass plate to be disposed on the vehicle interior side is preferably from 0.3 to 2.3 mm. When the plate thickness of the glass plate disposed on the vehicle interior side is 0.3 mm or more, handling efficiency will be good, and when it is 2.3 mm or less, the mass will not be too large.

The glass plate 10 may be single curved such that it is bent only in one direction or may be complex curved such that it is bent in two directions (for example in a predetermined direction and in a direction orthogonal to the predetermined direction). The bending may be conducted e.g. by gravity forming or press forming. In a case where the glass plate is bent in a predetermined curvature and curved, the radius of curvature of the glass plate 10 may be from 1,000 to 100,000 mm.

As shown in FIG. 1, the resin frame 20 is formed on the peripheral portion of the glass plate 10. The resin frame 20 may be provided, as shown in FIG. 1, on the entire peripheral portion of the glass plate 10, or may be formed only on a part of the peripheral portion. Further, the resin frame 20 may be continuous or discontinuous in the circumferential direction. Further, in the example shown in FIG. 2, the resin frame 20 is provided to cover the peripheral portion. That is, it is provided to be in contact with both the principal surfaces (the vehicle exterior side surface 11 and/or the vehicle interior side surface 12) and the edge surface 13 of the glass plate 10. However, the resin frame 20 may be provided to be in contact with only one principal surface (the vehicle exterior side surface 11 or the vehicle interior side surface 12) and the edge surface 13. The range where the resin frame 20 is provided on the principal surface of the glass plate 10 may be, on the vehicle exterior side surface 11, 3.0 mm inside (toward the center of the glass plate 10) or more from the edge (or the position of the edge surface 13) of the glass plate 10, and on the vehicle interior side surface 12 also, it may be 3.0 mm inside or more from the edge (or the position of the edge surface 13) of the glass plate 10.

The resin to be used for the resin frame 20 is not particularly limited so long as it can form a product integrated with the glass plate 10, and is preferably one applicable to injection molding, that is one which can be melted by heating and can be solidified by cooling after the heating. The resin to be used for the resin frame 20 may be a thermoplastic resin, and for example, a polyvinyl chloride resin, and polyolefin, polyester, polystyrene, polyamide and polyurethane resins as well can be used.

Further, at the peripheral portion of the glass plate 10, at least along the vehicle interior side surface, a shielding layer (also called black ceramic) may be provided. The shielding layer is a layer having a function to protect e.g. a sealant to bond and hold the glass plate for a vehicle to the vehicle body, and can be formed by applying a colored ceramic paste (glass paste), followed by baking. The color of the shielding layer may be black, or gray, blown or the like as well. The color of the shielding layer can be imparted by selecting the color of the pigment contained in the ceramic paste.

Figure 3:
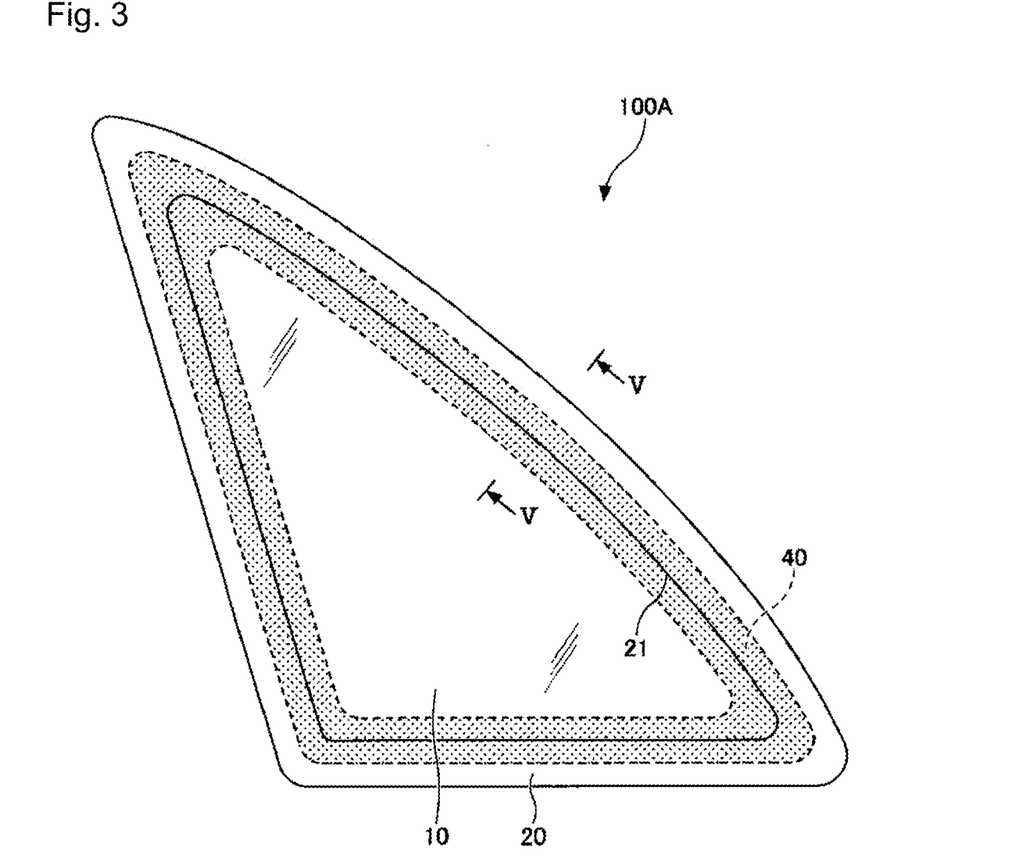
FIG. 3 is a plan view illustrating a glass plate with resin frame obtained by a modified example of the embodiment, as viewed from the vehicle exterior side.
Figure 4:
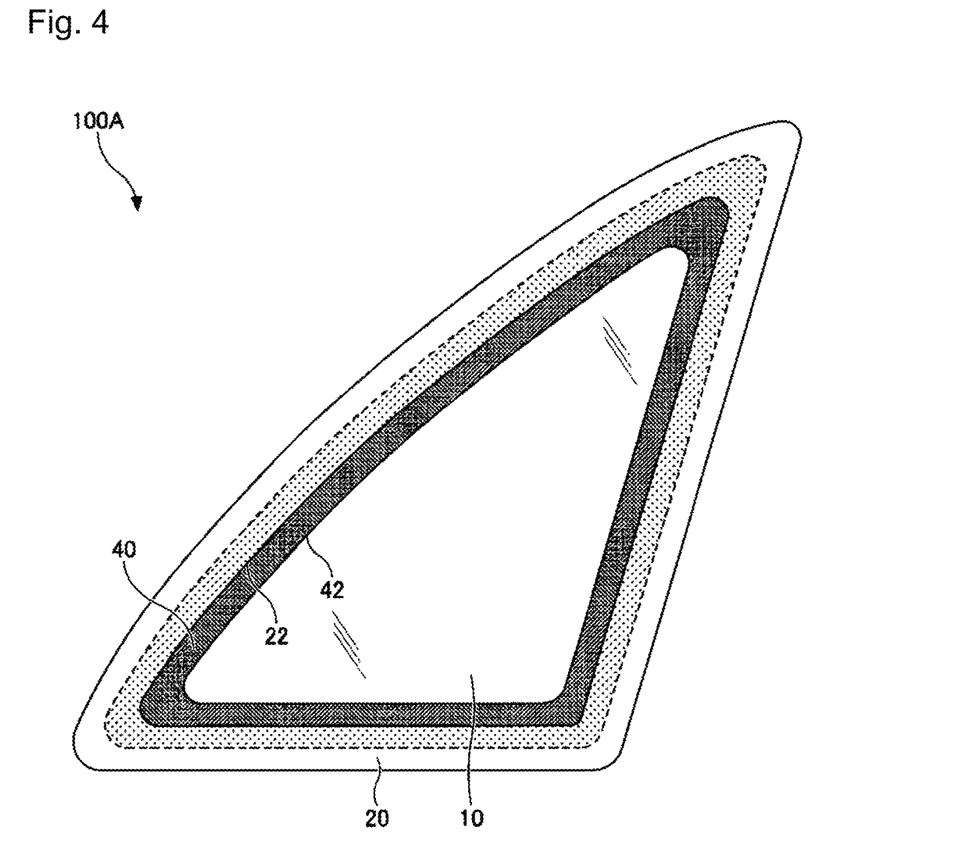
FIG. 4 is a plan view illustrating a glass plate with resin frame obtained by the modified example, as viewed from the vehicle interior side.
Figure 5:
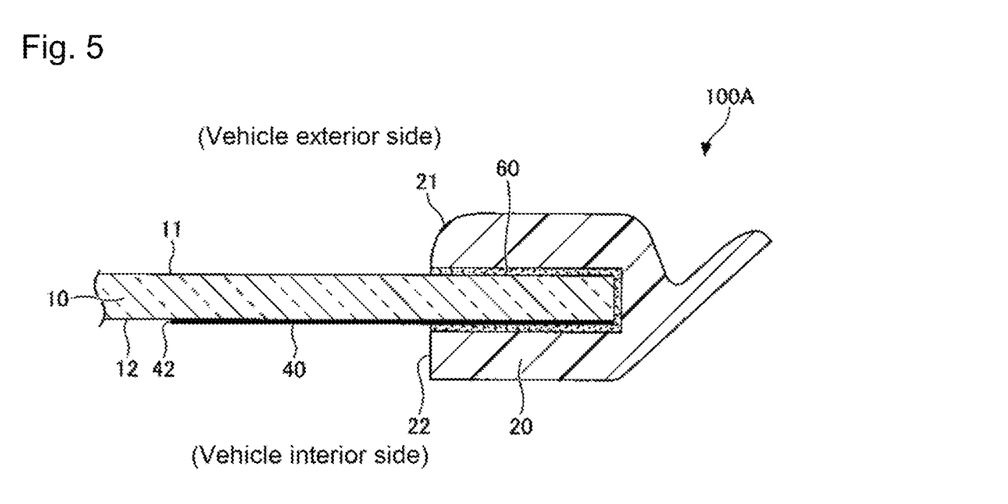
FIG. 5 is a cross sectional view at the line V-V in FIG. 3.

In FIG. 3, a plan view illustrating a glass plate 100A with resin frame provided with a shielding layer 40 as a modified example of the present embodiment, as viewed from the vehicle exterior side, is shown. Further, in FIG. 4, a plan view illustrating the glass plate 100A with resin frame provided with a shielding layer 40, as viewed from the vehicle interior side, and in FIG. 5, a cross sectional view at the line V-V in FIG. 3, are shown. As shown in FIGS. 3 to 5, the shielding layer 40 may be formed on the entire periphery of the glass plate 10, or may be formed only on a part of the peripheral portion. Further, the shielding layer 40 may be provided continuously or discontinuously in a circumferential direction. The shielding layer 40 may be provided continuously or intermittently 6.0 mm inside or more from the edge (or the position of the edge surface 13) of the glass plate 10. The inner peripheral edge 42 of the shielding layer 40 may have an outline which follows the peripheral edge of the glass plate 10, or may have an optional outline. Further, as shown in FIGS. 3 to 5, the glass plate 100A with resin frame is formed so that the resin frame 20 covers the shielding layer 40 at least partly. More specifically, as viewed two-dimensionally, the shielding layer 40 protrudes from the inner peripheral edge 22 of the resin frame 20 and is exposed. In a case where the glass plate 100A with resin frame is provided with the shielding layer 40, the shielding layer 40 is exposed preferably 6.0 mm inside or more from the inner peripheral edge 22 of the resin frame 20. When the shielding layer 40 is exposed 6.0 mm inside or more from the inner peripheral edge 22 of the resin frame 20, an adhesive such as a urethane sealant to bond the glass plate 10 and a vehicle body flange which is not shown, can be applied.

The glass plate with resin frame can be formed by injection molding. Schematically speaking, the glass plate 10 is disposed at a predetermined position in the cavity of a mold, a heat-melted resin is injected into the cavity, followed by cooling to solidify the resin, and the mold is removed.

Now, the method for producing the glass plate with resin frame according to another embodiment of the present invention will be described with reference to FIGS. 6A to 6F and 7. Here, an example to produce the glass plate 100A with resin frame provided with the shielding layer 40, shown in FIGS. 3 to 5, will be described. The method for producing the glass plate with resin frame mainly comprises a resin forming step and a finishing step.

Figure 6A:
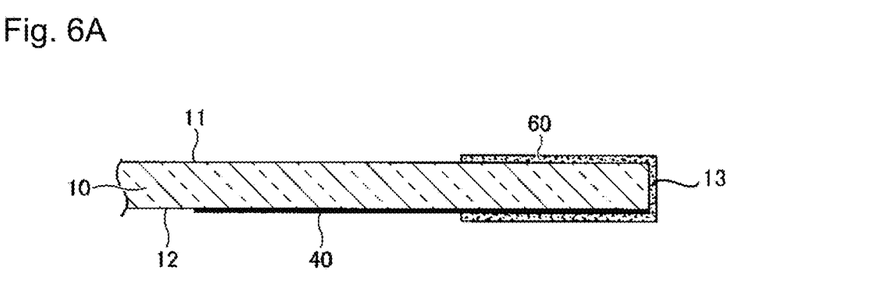
FIG. 6A is a diagram illustrating production of a glass plate with resin frame according to another embodiment of the present invention.

First, the resin forming step will be described. As shown in FIG. 6A, a glass plate 10 is prepared. In this example, the glass plate 10 has a shielding layer 40 formed on one principal surface at the peripheral portion. Further, it is preferred that a primer 60 is preliminarily applied to improve the adhesion between the resin and the glass plate, at a portion on which the resin frame is to be formed (a portion which the resin frame is to be in contact with) of the glass plate 10. In the example shown in FIG. 6A, the portion on which the resin frame is to be formed, corresponds to the vehicle exterior side surface 11 and the vehicle interior side surface 12 at the peripheral portion, and the edge surface 13, and thus the primer 60 is applied to these three surfaces.

Figure 6B:
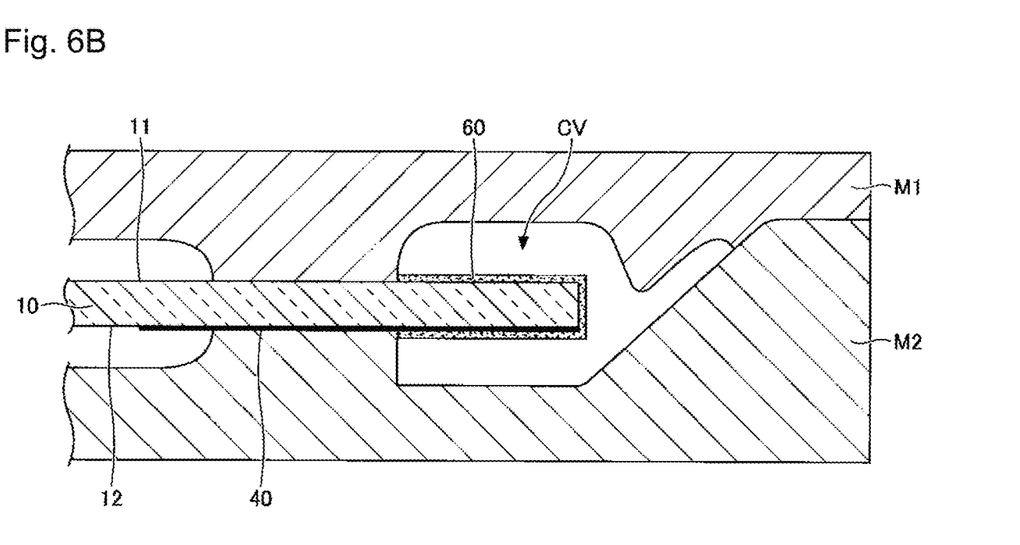
FIG. 6B is a diagram illustrating production of the glass plate with resin frame.

The prepared glass plate 10 is disposed in the mold as shown in FIG. 6B. The mold may be any mold which can form a cavity CV into which the resin is injected, and for example, it may be one comprising a first mold M1 and a second mold M2 to be combined up and down, as shown in FIG. 6B. Further, depending upon the shape of a final product of the glass plate with frame, three or more molds may be used, or a core (insert) may be used.

Figure 6C:
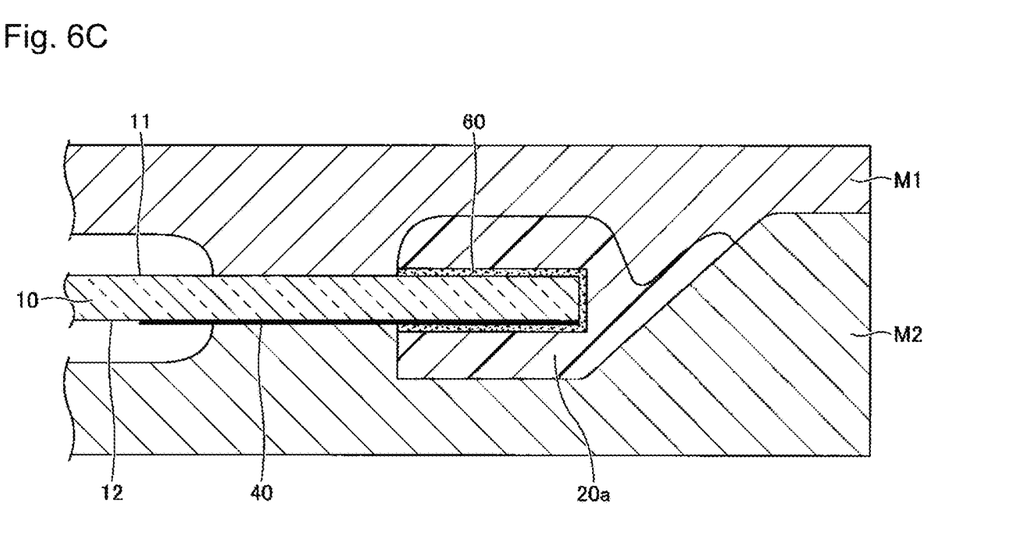
FIG. 6C is a diagram illustrating production of the glass plate with resin frame.

Then, into the cavity CV formed between the first mold M1 and the second mold M2, a resin 20a to be the resin frame 20 is injected. The resin 20a is preliminarily melted or softened to be in a fluidized state by heating, and the fluidized resin 20a is injected into the cavity CV by applying a predetermined pressure. FIG. 6C illustrates a state where the cavity CV (FIG. 6B) is filled with the resin 20a. As shown in FIG. 6C, the resin 20a is in contact with the vehicle exterior side surface 11, the vehicle interior side surface 12 and the edge surface 13 of the glass plate 10 and is formed into a frame shape so as to wrap the peripheral portion of the glass plate. In FIGS. 6B and 6C, illustration of a sprue (passage to inject the resin from outside) is omitted.

Figure 6D:
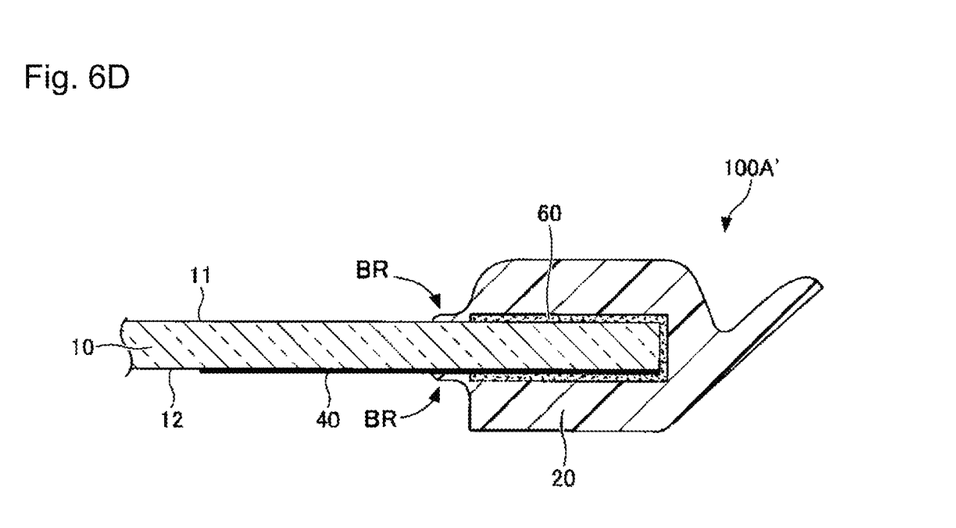
FIG. 6D is a diagram illustrating production of the glass plate with resin frame.

The resin 20a is cooled and solidified to a certain extent in the state of FIG. 6C, and then the mold is removed. In FIG. 6D, the glass plate 100A' with resin frame after the mold is removed and before the finishing step is carried out, is shown. As show in FIG. 6D, the glass plate 100A' with resin frame before the finishing step may have a resin flash BR formed. The flash may be formed by leakage of a resin between molds or between a mold and a member other than the resin in the forming step. Thus, the flash may be formed by the resin leaking between the mold and the glass plate 10, as protruding inside (toward the center of the glass plate 10) from the inner peripheral edge in the plane direction on the inner peripheral edge 21 or 22 of the resin frame 20. In a case where the resin frame 20 is formed to wrap the peripheral portion of the glass plate 10, the flash BR may be formed, as shown in FIG. 6D, on the inner peripheral edge 21 on the vehicle exterior side and on the inner peripheral edge 22 on the vehicle interior side.

Figure 7:
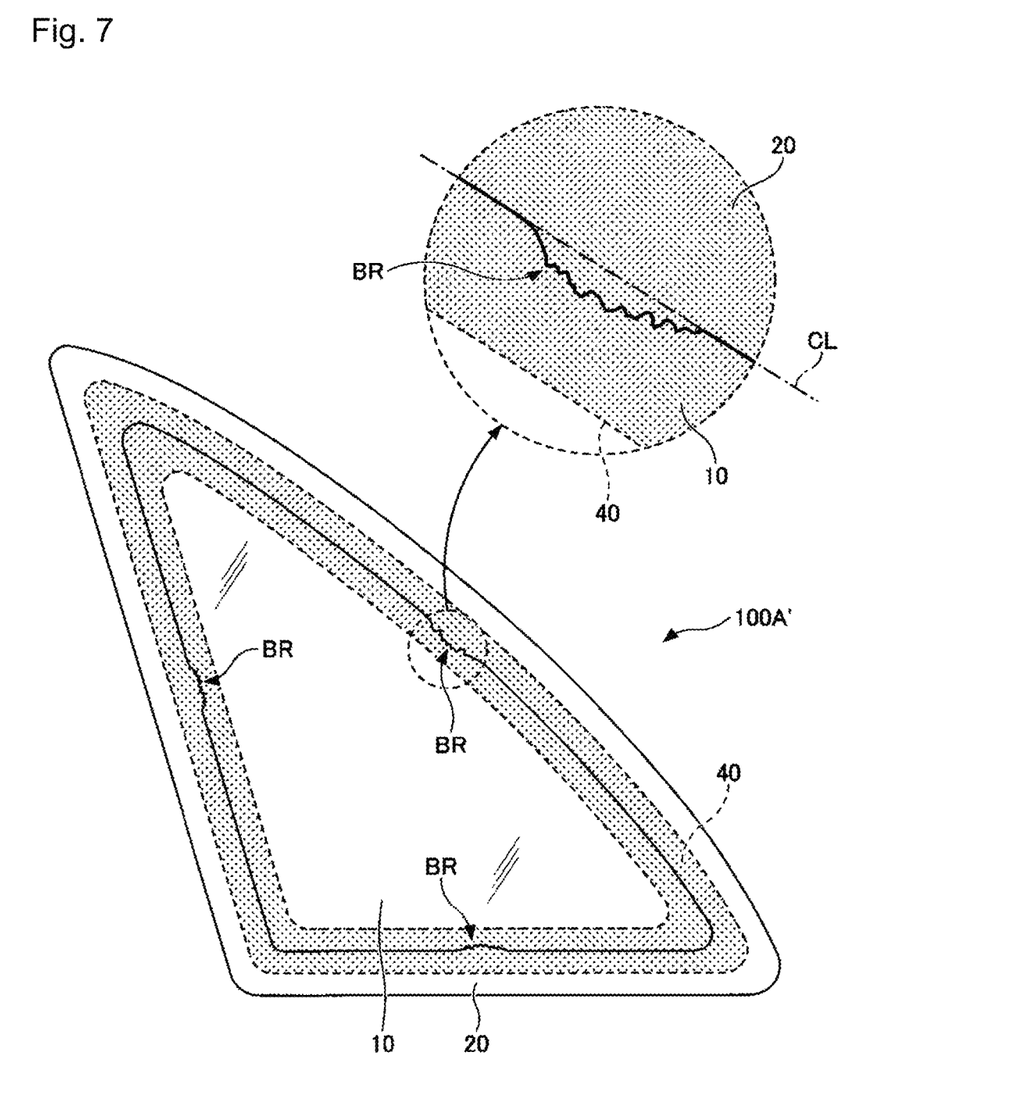
FIG. 7 is a plan view illustrating a glass plate with resin frame before finishing.

In FIG. 7, a plan view illustrating the glass plate 100A' with resin frame before the finishing step (before flash removing step), as viewed from the vehicle exterior side surface 11, is shown. The flash BR may be formed along the entire inner peripheral edge 21 in some cases or as shown in FIG. 7, one or more flashes BR may be formed partially on the inner peripheral edge 21. The flash BR is an unnecessary portion formed by processing of the resin and thus if the flash BR remains in the product, it may cause disadvantages in handling of the product or may impair the appearance of the product. Accordingly, it is preferred to remove the flash BR. The glass plate 100A' with resin frame before the finishing step may have a flash not only on the vehicle exterior side surface 11 but also on the vehicle interior side surface 12, as described above.

Figure 6E:
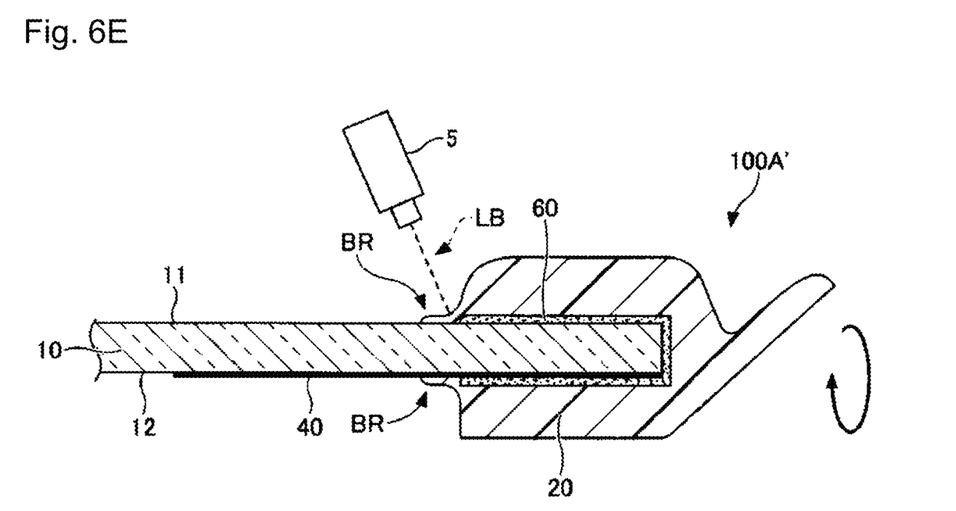
FIG. 6E is a diagram illustrating production of the glass plate with resin frame.

In the present embodiment, in the finishing step, the flash BR formed by injection molding is removed by irradiation with laser beam. In FIG. 6E, the glass plate 100A' with resin frame (FIG. 6D) before the finishing step is shown again. As shown in FIG. 6E, a portion where the flash BR is formed is irradiated with laser beam LB emitted from a laser beam generating unit 5. Scanning with laser beam LB is conducted, for example, preferably along the cutting line CL (the upper right enlarged view in FIG. 7) which is the boundary between the inner peripheral edge 21 of the resin frame 20 (the inner peripheral edge of the final product) and the flash BR.

Figure 6F:
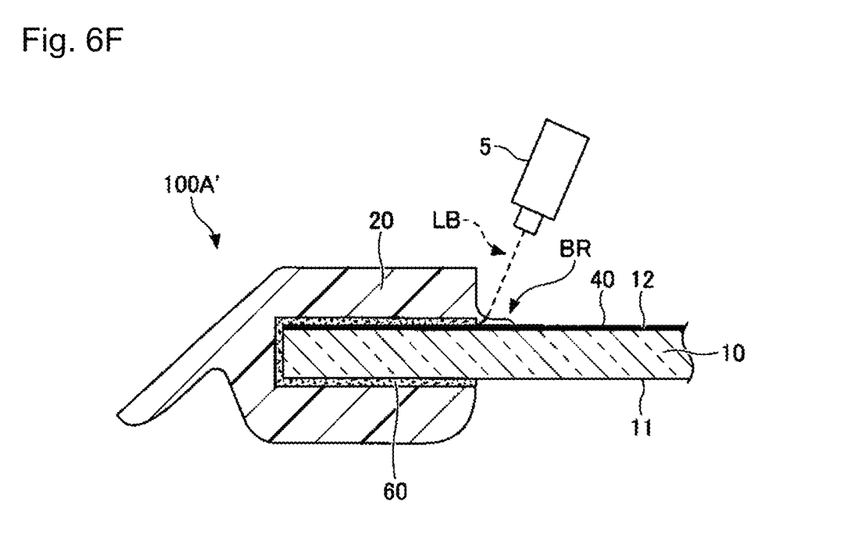
FIG. 6F is a diagram illustrating production of the glass plate with resin frame.

By irradiation with laser beam shown in FIG. 6E, the flash BR formed on the vehicle exterior side can be cut off. Then, as shown in FIG. 6F, the glass plate 100A' with resin frame is turned upside down so that the vehicle interior side faces the laser beam generating unit 5, and the flash BR formed on the vehicle interior side can be cut off. The flash BR cut off may be let fall naturally, or removed by blowing a gas such as the air. Finally, a glass plate 100A with resin frame (FIGS. 3 and 4) having no or substantially no flash BR can be obtained.

Heretofore, removal of the flash formed on a glass plate with resin frame was conducted manually by hands. Whereas in the present embodiment, the flash is removed by irradiation with laser beam, and thus the operation can be conducted in a short time at a low cost as compared with a conventional method, and scars on the glass and the resin frame can be reduced. Further, laser beam has high directivity or convergence, and thus can be applied with a small spot size (the size of a condensed portion on the surface of the resin frame). Accordingly, the laser beam can cut the resin with a thin cutting line and can remove the flash more accurately. For example, it is possible to prevent excessive removal of the flash (that is, the flash can be removed but a part of the product is also removed), or insufficient removal (the flash remains unremoved).

As shown in FIG. 6E, to remove the flash BR, the laser beam LB is applied to a portion where the glass plate 10 and the resin frame 20 overlap with each other in the thickness direction. Scanning is conducted preferably along the inner peripheral edge 21 of the resin frame 20 in the circumferential direction of the glass plate 10. On that occasion, it is preferred to adjust the energy density E of the laser beam LB to be equal to or higher than the processing threshold Er for the resin frame 20, and to be lower than the processing threshold Eg for the glass plate 10 ($Eg>E \geq Er$). The "processing threshold" is the lowest energy density with which a predetermined material can be processed. By adjustment of the energy density as described above, only the resin frame 20 is cut by the laser beam LB, and it is possible to prevent the glass plate 10 disposed under the resin frame 20 from being cut, and, it is possible to reduce or prevent formation of recesses and scars on the surface of the glass plate 10 in contact with the resin frame 20.

Further, in a case where the flash BR formed on the vehicle interior side on which the shielding layer 40 is formed (FIG. 6F) is to be cut off, in the same manner as in the case of the vehicle exterior side, the laser beam is applied to a portion where the glass plate 10 and the resin frame 20 overlap with each other in the thickness direction. However, as shown in FIG. 6F, in a case where the shielding layer 40 is present between the flash BR and the glass plate 10, that is in a case where the shielding layer 40 is disposed beneath the flash BR, it is preferred to adjust the energy density E of the laser beam LB to be equal to or higher than the processing threshold Er for the resin frame 20 and to be lower than the processing threshold Eg for the glass plate 10 and the processing threshold Eb for the shielding layer 40 ($Eg>E \geq Er$ and $Eb>E \geq Er$), whereby only the resin frame 20 can be cut by the laser beam LB, and it is possible to reduce or prevent removal of a part of the shielding layer 40 disposed under the resin frame 20 and to reduce or prevent formation of recesses and scars on the surface of the glass plate 10.

As described above, by adjusting the energy density of the laser beam LB to be equal to or higher than the processing threshold for the resin frame 20 and to be lower than the processing threshold for the glass plate 10 and the processing threshold for the shielding layer 40, laser beam with a single energy density can be used for removal of the flashes both on the vehicle exterior side and on the vehicle interior side, as shown in FIGS. 6E and 6F. Thus, removal of the flashes can be conducted under single irradiation conditions without changing the laser beam irradiation conditions as between on the vehicle exterior side and on the vehicle interior side. However, the present invention is not limited to processing under the same conditions as between on the vehicle exterior side and on the vehicle interior side.

The laser beam generation method is not particularly limited, and any of solid laser, gas laser and liquid laser may be employed. As specific examples, solid laser such as $Nd:YVO_4$ laser, Nd:YAG laser, fiber laser and LD laser, and gas laser such as $CO_2$ laser, He—Ne laser, excimer laser and argon laser may be mentioned. The laser beam may be fundamental wavelength waves or may be high harmonic waves obtained by wavelength conversion of fundamental wavelength waves.

The present inventors have found that when laser beam is employed, the processing threshold Eg for the glass plate 10 tends to be higher than the processing threshold Er for the resin frame 20. Accordingly, by employing laser beam, the energy density E can easily be adjusted to be equal to or higher than the processing threshold Er for the resin frame 20 and to be lower than the processing threshold Eg for the glass plate 10 ($Eg>E \geq Er$), and it is thereby possible to easily remove the flash without impairing the quality of the glass plate 10.

The wavelength of the laser beam is also not particularly limited, and in view of easiness of constitution of the laser beam generating apparatus, the cost, etc., it is preferably from 200 to 20,000 nm, more preferably from 300 to 11,000 nm. Further, the laser beam is preferably UV laser beam, that is, the wavelength of the laser beam is preferably within an ultraviolet range (10 to 400 nm). More specifically, the wavelength of the laser beam is preferably 380 nm or less, more preferably 360 nm or less. The laser beam may be green laser beam having a wavelength of from 500 to 600 nm.

The present inventors have also found that when UV laser beam is used, not only the processing threshold Eg for the glass plate 10 tends to be higher than the processing threshold Er for the resin frame 20 as mentioned above, but also the processing threshold Eb for the shielding layer 40 tends to be higher than the processing threshold Er for the resin frame 20. Accordingly, by irradiation with UV laser beam, the energy density E of the laser beam can easily be adjusted to be higher than the processing threshold Er for the resin frame 20 and to be lower than the processing threshold Eg for the glass plate 10 and the processing threshold Eb for the shielding layer 40 (Eg>E≥Er and Eb>E≥Er). Thus, it is possible to remove the flash without making scars on the shielding layer and the glass plate disposed under the flash, in the finishing step by irradiation with laser beam.

Further, the present inventors have also further found that when UV laser beam is employed, the processing threshold Eg for the glass plate 10 tends to be higher than the processing threshold Eb for the shielding layer 40. Accordingly, even when the glass plate 100A with resin frame provided with the shielding layer 40 is to be produced, by adjusting the energy density E of the laser beam to be equal to or higher than the processing threshold Er for the resin frame 20 and to be lower than the processing threshold Eb for the shielding layer 40 (Eb>E≥Er), it is possible to remove the flash without impairing the quality of the shielding layer and the glass plate.

Further, when the laser beam is UV laser beam, thermal effect at the time of processing is reduced, and it is thereby possible to prevent deformation of the glass plate 10 and to minimize deformation or denaturization of the inner peripheral edge of the resin frame 20 at the time of cutting the flash BR. Further, when the laser beam is UV laser beam, since glass has high absorptance for UV wavelength, influence over the interlayer film to be used for a laminated glass, the shielding film constituted on the laser emission side and the resin frame can be reduced.

The laser beam may be continuous wave (CW) or may be pulsed wave. The pulsed wave is preferred, by which thermal effect at the time of processing is reduced. In a case where the laser beam is pulsed laser, the pulse width of the laser beam is preferably 100 femtoseconds or more and 100 nanoseconds or less. The energy density of the laser beam is preferably 10 mJ/cm$^2$ or more, more preferably 100 mJ/cm$^2$ or more. When the energy density of the laser beam is 10 mJ/cm$^2$ or more, the flash BR can more securely be cut. The energy density of the laser beam is preferably 10 J/cm$^2$ or less, more preferably 5 J/cm$^2$ or less. When the energy density of the laser beam is 10 J/cm$^2$ or less, it is possible to reduce or prevent denaturization of the glass plate 10 and the shielding layer 40 and deformation or denaturization of the resin frame 20. The processing interval of the laser beam is preferably 0.1 µm or more and 100 µm or less, more preferably 1 µm or more and 50 µm or less. When the processing interval of the laser beam is 0.1 µm or more, the flash BR can securely be cut, and further, the energy imparted to cut the flash BR will not be excessive, and thus it is possible to suppress deterioration of the flash BR cutting quality (increase of the region where the shielding layer 40 is denatured) and impairment of quality of the glass plate 10. When the processing interval of the laser beam is 100 µm or less, it is possible to reduce or prevent denaturization of the glass plate 10 and the shielding layer 40 and denaturization or deformation of the resin frame 20.

As described above, scanning with the laser beam is conducted preferably along the cutting line CL (the upper right enlarged view in FIG. 7) which is the boundary between the inner peripheral edge 21 of the resin frame 20 (the inner peripheral edge of the final product) and the flash BR. Scanning with the laser beam may be conducted by moving the laser beam generating unit 5 relative to the glass plate with resin frame before the finishing step, or may be conducted by fixing the position of the laser beam generating unit 5 and moving the glass plate with resin frame before the finishing step relative to the laser beam generating unit 5. Thus, the laser beam generating unit 5, and/or a stage or a carrying unit on which the glass plate with resin frame before the finishing step is placed, are preferably movable at least along the principal surface of the glass plate 10 (at least capable of 2-axis scanning). Further, scanning with the laser beam may be conducted by a galvanoscanner. Further, in order to move the laser beam generating unit 5, and the stage on which the glass plate with resin frame before the finishing step is to be placed, a robot may be used. As a robot, a vertical articulated robot, a horizontal articulated robot, a parallel link robot and the like may be used. By using a robot, the flash BR can accurately be cut off even when the cutting line to cut off the flash BR (the outline of the inner peripheral edge) is not linear or draws a predetermined pattern.

The direction of irradiation with the laser beam LB is not particularly limited, but is preferably not a direction orthogonal to the glass plate 100A' with resin frame before the finishing step (the direction normal to the glass plate 10), but as indicated in the schematic view of FIGS. 6E and 6F, a direction inclined inside of the peripheral portion from the above orthogonal direction. The inclination angle may be 15° or less. When the laser beam LB irradiation direction is inclined, the laser beam can more securely be applied to the flash BR and the inner peripheral edge 21 or 22, and it is possible to reduce deformation or denaturization of the resin frame 20 main body (the portion of the resin frame 20 excluding the flash BR).

Further, the work distance (the distance from the laser emission surface to the glass plate principal surface) at the time of irradiation with the laser beam LB is preferably 50 mm or more and 1,000 mm or less, more preferably 150 mm or more and 1,000 mm or less. The spot size of the laser beam LB is preferably 1 µm or more and 200 µm or less, more preferably 1 µm or more and 100 µm or less. Further, the focal spot shape is not limited to circular and may be elliptic or doughnut shape.

The energy distribution at the condensed portion of the laser beam LB is not limited to Gaussian distribution. For example, using a diffractive optical element (DOE), the energy distribution may be set to top-hat distribution or doughnut distribution.

As mentioned above, the method for producing the glass plate with resin frame according to the present embodiment comprise a resin forming step and a finishing step. The resin forming step may include preparing the glass plate, placing the glass plate in a mold, injection-molding a resin, removing the mold, and solidifying the resin to obtain the glass plate with resin frame before treatment. Further, the finishing step is a step of removing the flash, and may include detecting the flash on the inner peripheral edge of the resin frame, cutting the flash by laser beam and removing the cut flash from the glass plate.

Figure 8:
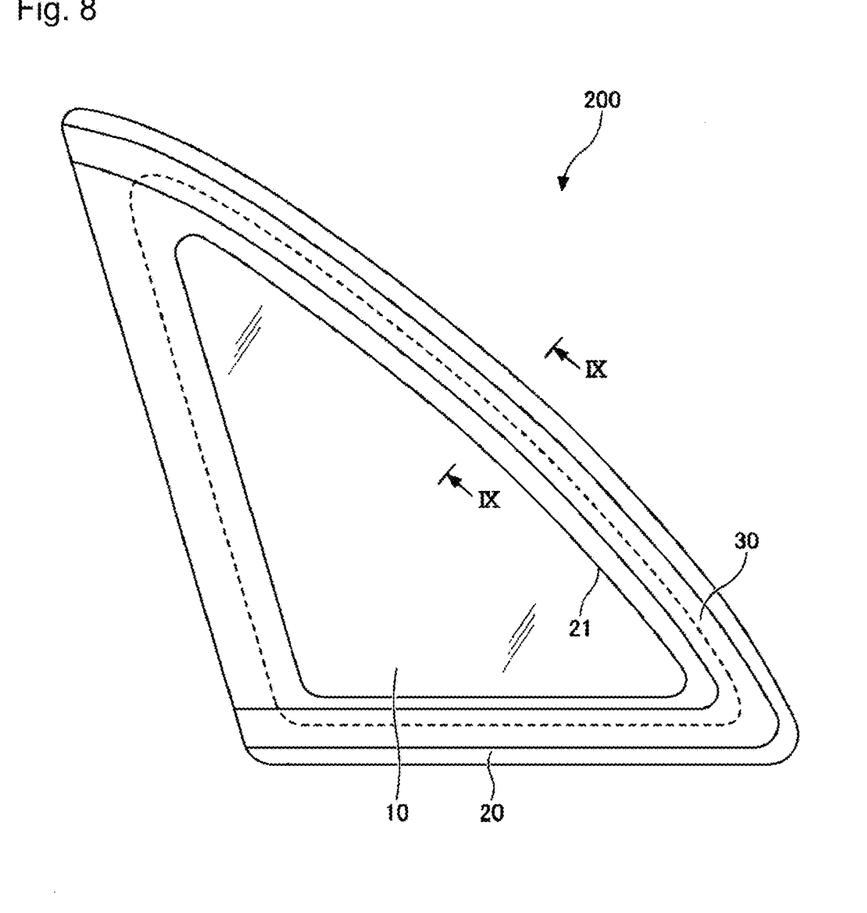
FIG. 8 is a plan view illustrating a glass plate with resin frame obtained according to another embodiment of the present invention.
Figure 9:
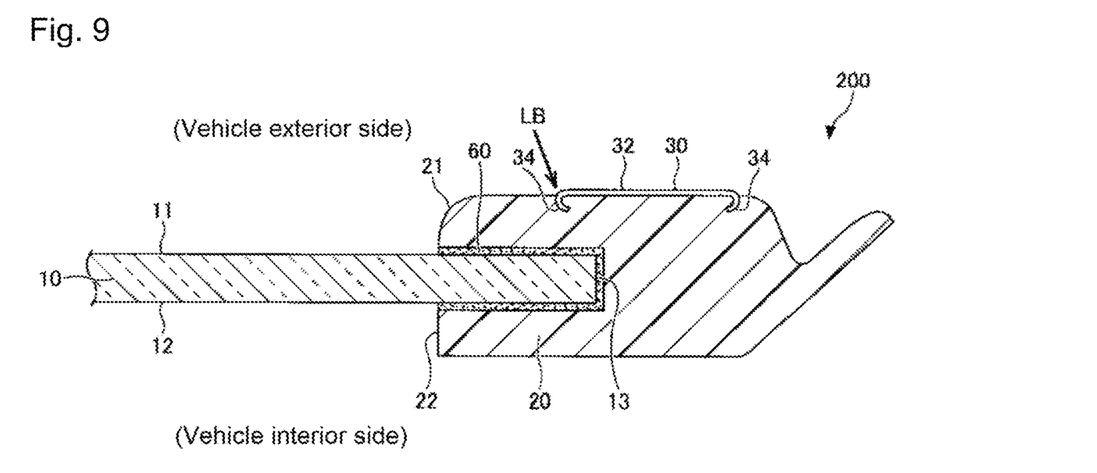
FIG. 9 is a cross sectional view at the line IX-IX in FIG. 8.

Further, the glass plate with resin frame produced according to another embodiment of the present invention, may have a decorative member (also called a decorating member or a decorative molding) provided on the resin frame. In FIG. 8, a plan view illustrating a glass plate 200 with resin frame, having a glass plate 10, a resin frame 20 formed on the peripheral portion of the glass plate 10 and a decorative member 30 provided on the resin frame 20 integrated, is shown. FIG. 8 is a view illustrating the glass plate 200 with resin frame as viewed from the vehicle exterior side. FIG. 9 is a cross sectional view at the line IX-IX in FIG. 8.

The decorative member 30 may be a long plate-shaped exterior member formed on the vehicle exterior side of the glass plate 200 with resin frame, formed mainly for decorating vehicle windows. The plate thickness of the decorative member 30 may be from 0.1 mm to 0.7 mm. Further, on the surface (vehicle exterior side surface) of the decorative member 30, an oxide layer or film to protect the surface may be formed.

The material used for the decorative member 30 may be a rigid material such as a metal or a rigid resin, and is preferably a metal, particularly stainless steel, which has high rigidity and is likely to impart gloss. Stainless steel may be austenitic or ferritic steel, and as specific examples, NK-430MA, NK-436L-NB, SUS430, SUS304, etc. may be mentioned. By using a metal-made decorative member 30, it is possible to impart sophistication with high design property to the glass plate 200 with resin frame, and it is also possible to reinforce the resin frame 20 along the periphery.

The decorative member 30 may be formed on the surface of the resin frame 20 so as to overlap with the range where the resin frame 20 is provided, as viewed two-dimensionally. In the embodiment shown in FIG. 8, the decorative member 30 is disposed along two sides of the glass plate 200 with resin frame which is approximately triangular as viewed two-dimensionally, however, it may be disposed continuously along the entire peripheral portion of the glass plate 200 with resin frame. Further, as shown in FIG. 9, the decorative member 30 is partially embedded in the resin frame 20 and is integrally bonded to the resin frame 20. That is, the decorative member 30 has an exposed portion 32 at least partially exposed from the resin frame 20 and an embedded portion 34 embedded in the resin frame 20. In the example shown in FIG. 9, the embedded portion 34 is formed at a side closer to and a side away from the glass plate 10, of the decorative member 30.

To produce the glass plate 200 with resin frame provided with the decorative member 30, in the resin forming step, when the glass plate 10 is placed in the mold (FIG. 5B), the decorative member 30 is also placed in the mold, and then the resin is injected. Possibility of leakage of the resin in a space between the mold and a member other than the resin, is as described above. Leakage of the resin is also likely to occur in a space between the mold and the decorative member 30. Accordingly, the flash is likely to form at the parting position between the decorative member 30 and the resin frame 20, that is at a boundary between the exposed portion 32 of the decorative member 30 and the resin frame 20. Such a flash if seen may cause disadvantages at the time of handling the product or may impair the appearance of the product, and thus is preferably removed.

According to the method for producing the glass plate with resin frame of the present embodiment, the flash formed at the boundary between the decorative member 30 and the resin frame 20 can also be removed by irradiation with laser beam. In such a case, the laser beam can be applied to a vicinity of a position indicated by the arrow LB shown in FIG. 8. In a case where the flash formed at the boundary between the decorative member 30 and the resin frame 20 also, the laser beam irradiation conditions may be the same as the laser beam irradiation conditions to remove the flash formed on the inner peripheral edge 21 of the resin frame 20.

According to the present embodiment, the flash can be removed in a short time at a low cost not only at the parting position between the glass plate 10 (the shielding layer if provided) and the resin frame 20 but also at the parting position between the decorative member 30 and the resin frame 20, and further, it is possible to reduce scars on the glass and the resin frame, and thus, a glass plate 200 with resin frame which has a beautiful appearance as a whole can be obtained.

To remove the flash formed at the boundary between the decorative member 30 and the resin frame 20, the energy density E of the laser beam is preferably adjusted to be equal to or higher than the processing threshold Er for the resin frame and lower than the processing threshold Em for the decorative member (Em>E≥Er). By adjusting the energy density E of the laser beam to be equal to or higher than the processing threshold Er for the resin frame and to be less than the processing threshold Eg for the glass plate and the processing threshold Em for the decorative member Em (Eg>E≥Er and Em>E≥Er), it is possible to remove both the flash formed on the inner peripheral edge 21 or 22 of the resin frame 20 and the flash formed at the boundary between the resin frame 20 and the decorative member 30, without changing the laser irradiation conditions. Further, by adjusting the energy density E of the laser beam to be equal to or higher than the processing threshold Er for the resin frame and to be lower than the processing threshold Eg for the glass plate, the processing threshold Eb for the shielding layer and the processing threshold Em for the decorative member Em (Eg>E≥Er, Eb>E≥Er and Em>E≥Er), even in a constitution provided with the shielding layer, it is possible to remove the flash while damages on the glass plate, the shielding layer and the decorative member are minimized. Adjustment of the energy density of the laser beam as mentioned above can easily be conducted by using UV laser beam as the laser beam.

Figure 10:
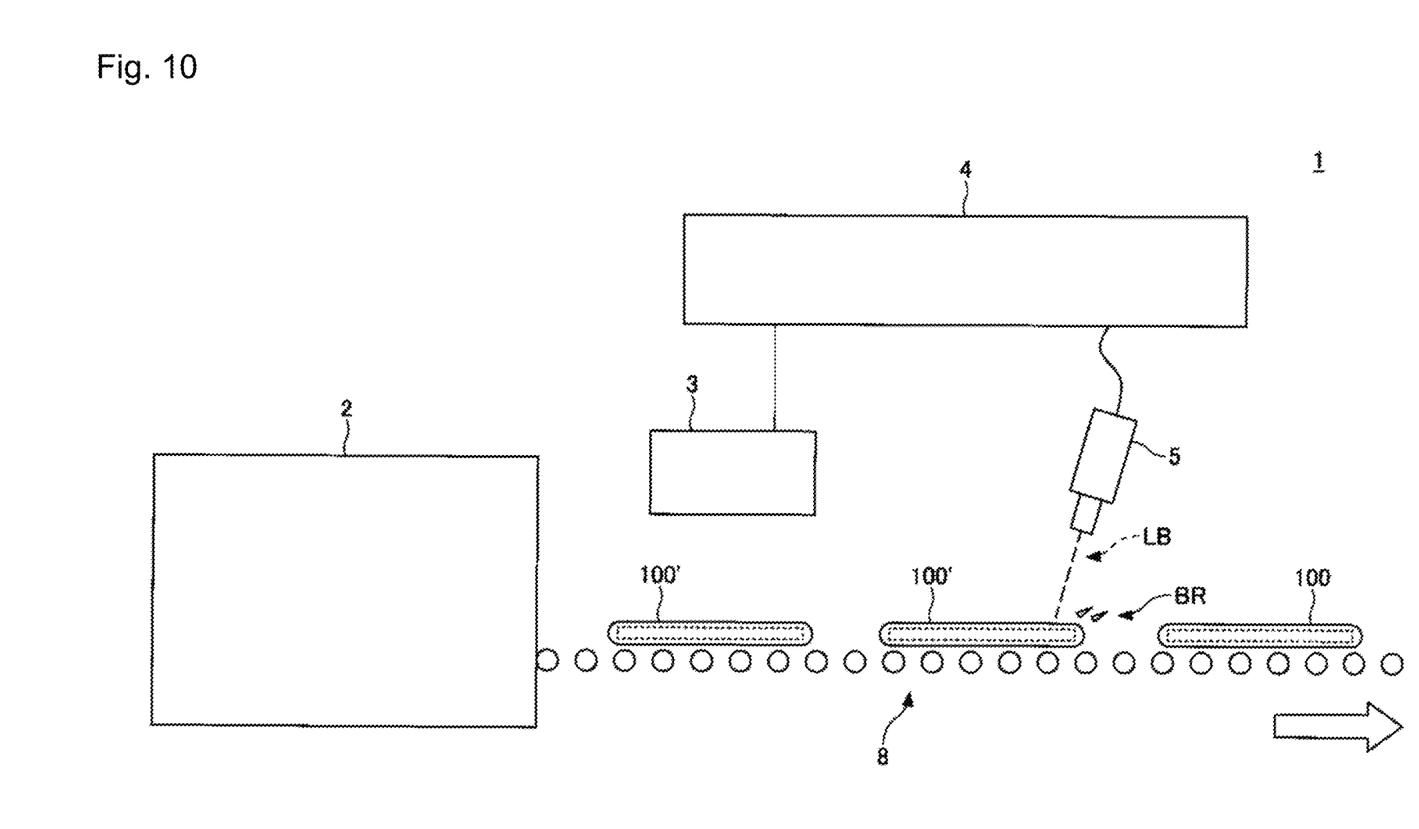
FIG. 10 is a schematic view illustrating an apparatus for producing a glass plate with resin frame according to another embodiment of the present invention.

Now, an apparatus to produce the above described glass plate with resin frame will be described. In FIG. 10, a schematic view illustrating an apparatus 1 for producing the glass plate with resin frame is shown. As shown in FIG. 10, the production apparatus 1 may have mainly an injection molding unit 2, a flash detecting unit 3 and a laser beam generating unit 5. In the injection molding unit 2, as described with reference to FIGS. 6A to 6F, a resin is injection-molded, whereby a glass plate 100' with resin frame before finishing, having the glass plate 10 and the resin frame 20, is obtained. The glass plate 100' with resin frame before finishing is carried by a carrying unit 8.

Then, the flash formed on the carried glass plate 100' with resin frame before finishing is detected by the flash detecting unit 3. The detected flash is cut off by irradiation with laser beam LB by the laser beam generating unit 5. The flash detecting unit 3 and the laser beam generating unit 5 may be connected to a control unit 4. The control unit 4 may set the irradiation conditions of the laser beam generating unit 5, the laser beam scanning trail and the like based on information about the shape, the position, etc. of the flash detected by the flash detecting unit 3, and control movement of the laser beam generating unit 5 based on the setting. The control unit 4 may conduct control by a robot, and the laser beam generating unit 5 is connected to e.g. a robot arm. Otherwise, the glass plate 100' with resin frame before finishing may be carried to a predetermined stage, and movement of the stage is controlled by a robot.

According to the production apparatus of the present embodiment, operation from injection-molding for the resin frame to the flash removing step (finishing step) can be carried out in-line. Thus, a glass plate with resin frame which has a beautiful appearance can be produced in a short time at a low cost, with reduced scars on the glass and the resin frame.

REFERENCE SYMBOLS

1: apparatus for producing glass plate with resin frame
2: injection molding unit
3: flash detecting unit
4: control unit
5: laser beam generating unit
8: carrying unit
10: glass plate
11: vehicle exterior side surface
12: vehicle interior side surface
13: edge surface
20: resin frame
21: inner peripheral edge on vehicle exterior side
22: inner peripheral edge on vehicle interior side
30: decorative member
32: exposed portion
34: embedded portion
40: shielding layer
42: inner peripheral edge of shielding layer
60: primer
100: glass plate with resin frame
BR: flash
CV: cavity
CL: cutting line
LB: laser beam

What is claimed is:

1. A method for producing a glass plate with resin frame for a vehicle window, which comprises:
   forming a resin frame on a peripheral portion of a glass plate by injection molding, and
   removing a flash formed at an inner peripheral edge of the resin frame by irradiation with laser beam from a side of the glass plate, from which side the flash is being removed, wherein the laser beam is a pulsed laser beam and wherein the laser beam is applied at an energy density equal to or higher than the processing threshold for the resin frame and lower than the processing threshold for the glass plate.

2. The production method according to claim 1, wherein the glass plate has a shielding layer on at least one principal surface at the peripheral portion of the glass plate, and
   the resin frame is formed to partially cover the shielding layer.

3. The production method according to claim 2, wherein a pulse width of the pulse laser beam is 100 femtoseconds or more and 100 nanoseconds or less.

4. The production method according to claim 2, wherein the laser beam is UV laser beam or green laser beam.

5. The production method according to claim 1, wherein the resin frame is formed so that a decorative member is partially embedded in the resin frame, and
   the method further comprising removing a flash formed at the boundary in contact with the decorative member by irradiation with laser beam.

6. The production method according to claim 5, wherein the laser beam is applied at an energy density equal to or higher than the processing threshold for the resin frame and lower than the processing threshold for the decorative member.

7. The production method according to claim 1, wherein the energy density of the laser beam is 10 mJ/cm$^2$ or more and 10 J/cm$^2$ or less.

8. The production method according to claim 1, wherein the spot size of the laser beam is 1 μm or more and 100 μm or less.

9. The production method according to claim 1, wherein to remove the flash, the glass plate having the resin frame formed on its peripheral portion and/or a laser beam irradiation unit is moved by using a robot.

* * * * *